United States Patent
Chan et al.

(10) Patent No.: US 7,844,253 B2
(45) Date of Patent: Nov. 30, 2010

(54) METHOD AND APPARATUS FOR USING AN ELECTROMAGNETICALLY SHIELDED ENCLOSURE FOR EXCHANGING SECURE DATA

(75) Inventors: Steven S. Chan, Fremont, CA (US); George C. Huang, Los Altos Hills, CA (US)

(73) Assignee: Future Dial Inc., Sunnyvale, CA (US)

( * ) Notice: Subject to any disclaimer, the term of this patent is extended or adjusted under 35 U.S.C. 154(b) by 513 days.

(21) Appl. No.: 11/875,803

(22) Filed: Oct. 19, 2007

(65) Prior Publication Data

US 2008/0096494 A1 Apr. 24, 2008

Related U.S. Application Data

(60) Provisional application No. 60/862,147, filed on Oct. 19, 2006.

(51) Int. Cl.
*H04M 1/66* (2006.01)
(52) U.S. Cl. .............. 455/410; 455/301; 455/575.5; 455/106; 135/139
(58) Field of Classification Search .......... 455/410, 455/301, 575.5, 106, 300, 41.2; 135/139, 135/117
See application file for complete search history.

(56) References Cited

U.S. PATENT DOCUMENTS

| 4,244,302 | A | * | 1/1981 | Stine | 109/2 |
|---|---|---|---|---|---|
| 5,908,043 | A | * | 6/1999 | Paes et al. | 135/139 |
| 6,068,009 | A | * | 5/2000 | Paes et al. | 135/117 |
| 6,094,161 | A | * | 7/2000 | Cassen et al. | 342/175 |
| 6,121,544 | A | * | 9/2000 | Petsinger | 174/353 |
| 6,631,453 | B1 | * | 10/2003 | Friday | 711/163 |
| 7,522,729 | B2 | * | 4/2009 | Ishidoshiro | 380/270 |
| 2004/0119638 | A1 | * | 6/2004 | Fagan et al. | 342/357.03 |
| 2006/0126847 | A1 | * | 6/2006 | Ho | 380/277 |
| 2006/0230439 | A1 | * | 10/2006 | Smith et al. | 726/9 |
| 2006/0290497 | A1 | * | 12/2006 | Sugata | 340/572.1 |
| 2007/0044088 | A1 | * | 2/2007 | Eul | 717/174 |
| 2007/0133344 | A1 | * | 6/2007 | Bronstering et al. | 366/146 |
| 2008/0072051 | A1 | * | 3/2008 | Kaabouch et al. | 713/176 |
| 2008/0097655 | A1 | * | 4/2008 | Hadar et al. | 700/286 |
| 2008/0263654 | A1 | * | 10/2008 | Bahl et al. | 726/15 |
| 2008/0298587 | A1 | * | 12/2008 | Luk et al. | 380/255 |
| 2008/0301055 | A1 | * | 12/2008 | Borgs et al. | 705/64 |
| 2008/0301441 | A1 | * | 12/2008 | Calman et al. | 713/168 |
| 2009/0150005 | A1 | * | 6/2009 | Hadar et al. | 700/286 |
| 2009/0203355 | A1 | * | 8/2009 | Clark | 455/411 |
| 2009/0219899 | A1 | * | 9/2009 | Dost l et al. | 370/338 |

* cited by examiner

*Primary Examiner*—Minh D Dao
(74) *Attorney, Agent, or Firm*—Greenberg Traurig, LLP

(57) ABSTRACT

A method and apparatus to use a shielded enclosure for exchanging secure data. One embodiment comprises an enclosure formed of electromagnetically shielding material that prevents an electromagnetic field from entering an interior of the enclosure or emitting from the interior of the enclosure, the enclosure sized to house a mobile electronic device; a receiver within an interior of the enclosure to receive data transferred wirelessly from a mobile electronic device placed within the enclosure; and a hardware interface having a first end external to the enclosure and a second end within the interior of the enclosure and coupled to the antenna, the hardware interface to transfer data wirelessly received by the receiver to a separate device exterior to the enclosure.

20 Claims, 2 Drawing Sheets

METHOD AND APPARATUS FOR USING AN ELECTROMAGNETICALLY SHIELDED ENCLOSURE FOR EXCHANGING SECURE DATA

CLAIM OF PRIORITY

The present application claims priority to U.S. Provisional Patent Application Ser. No. 60/862,147, filed Oct. 19, 2006, which is incorporated herein by reference.

BACKGROUND

More and more individuals and organizations use phones or other small communication devices that utilize the Bluetooth short-range wireless connectivity standard. One vulnerability, however, of the Bluetooth standard is that during the bonding of devices for the purpose of accessing information, etc., a nearby person could, theoretically, snag the connection of the device and in extreme cases could empty out all the data stored in the device, including confidential information. One approach to prevent such actions has been to completely block any useful access to data through the Bluetooth-enabled device and allow the use of the Bluetooth-enabled device only for hands-free and headset devices. However, these limitations defeat the purpose of universal use of a Bluetooth-enabled device, including using the device as a modem and using the device as a means of locally synchronizing data or even uploading updates to the device.

SUMMARY

Described herein are methods and apparatuses to use a shielded enclosure for exchanging secure data. Some embodiments are summarized in this section.

One embodiment comprises an enclosure formed of electromagnetically shielding material that prevents an electromagnetic field from entering an interior of the enclosure or emitting from the interior of the enclosure, the enclosure sized to house a mobile electronic device; a receiver within an interior of the enclosure to receive data transferred wirelessly from a mobile electronic device placed within the enclosure; and a hardware interface having a first end external to the enclosure and a second end within the interior of the enclosure and coupled to the antenna, the hardware interface to transfer data wirelessly received by the receiver to a separate device exterior to the enclosure.

The present disclosure includes methods and apparatuses which perform these methods, including data processing systems which perform these methods, and computer readable media which when executed on data processing systems cause the systems to perform these methods.

Other features of the disclosure will be apparent from the accompanying drawings and from the detailed description which follows

BRIEF DESCRIPTION OF THE DRAWINGS

The present disclosure is illustrated by way of example and not limitation in the figures of the accompanying drawings in which like references indicate similar elements.

DESCRIPTION OF THE EMBODIMENT

In the following description, for purposes of explanation, numerous specific details are set forth in order to provide a thorough understanding of the description. It will be apparent, however, to one skilled in the art that embodiments of the disclosure can be practiced without these specific details. In other instances, structures and devices are shown in block diagram form in order to avoid obscuring the description.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Figure 1:
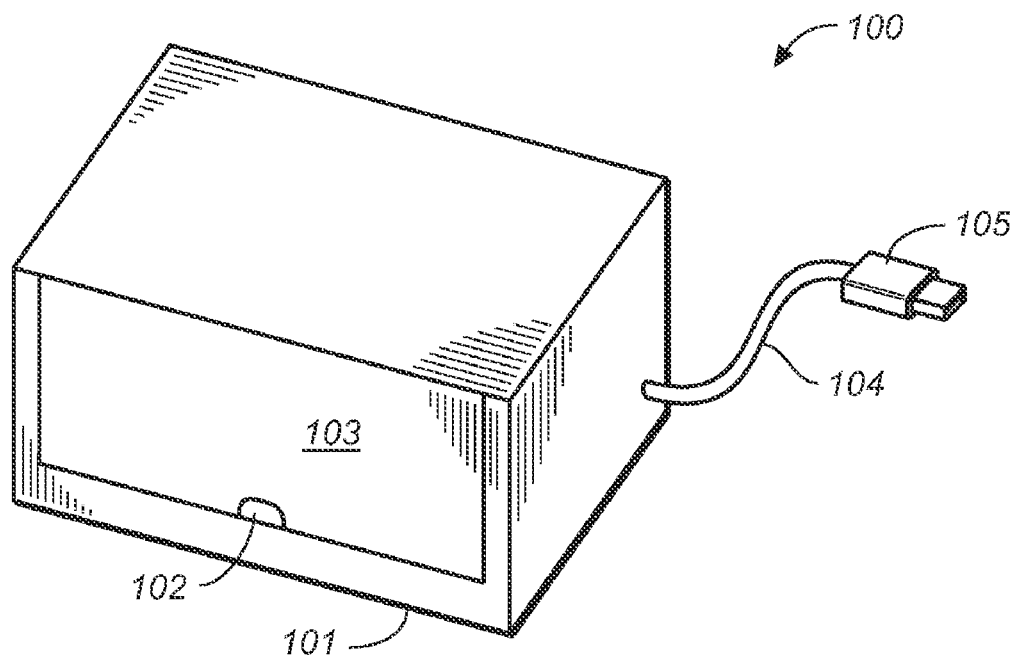
FIG. 1 illustrates an apparatus according to one embodiment.

FIG. 1 shows a system 100 according to one embodiment. The enclosure 101, as described herein is formed of electromagnetically shielding material that prevents an electromagnetic field from entering an interior of the enclosure or emitting from the interior of the enclosure. In one embodiment, the enclosure includes a built-in antenna and transceiver for wirelessly exchanging data with a mobile electronic device inserted within the enclosure. The enclosure is typically of a size made to receive a phone or similar small electronic communication device. The enclosure allows a Bluetooth-enabled device to securely communicate with the transceiver. The enclosure has a door 103 with a locking mechanism 102, which mechanism could be a latch, a magnet, or any other simple device or method or means to keep the door 103 securely closed. Also visible is a USB cable 104 and a USB connector 105. Not visible is the USB-to-Bluetooth transceiver and antenna inside the enclosure 101, which allows the exchange of data with an inserted device. Door 103 may be a see-through door, using either a suitable coated transparent material such as Mylar with metalization, by means similar to that employed in a microwave oven door. For example, a plastic window with a perforated metal shield, or metal or other conductive imprint on the plastic providing the shielding, or some other suitable transparent, electromagnetically shielding material.

Figure 2:
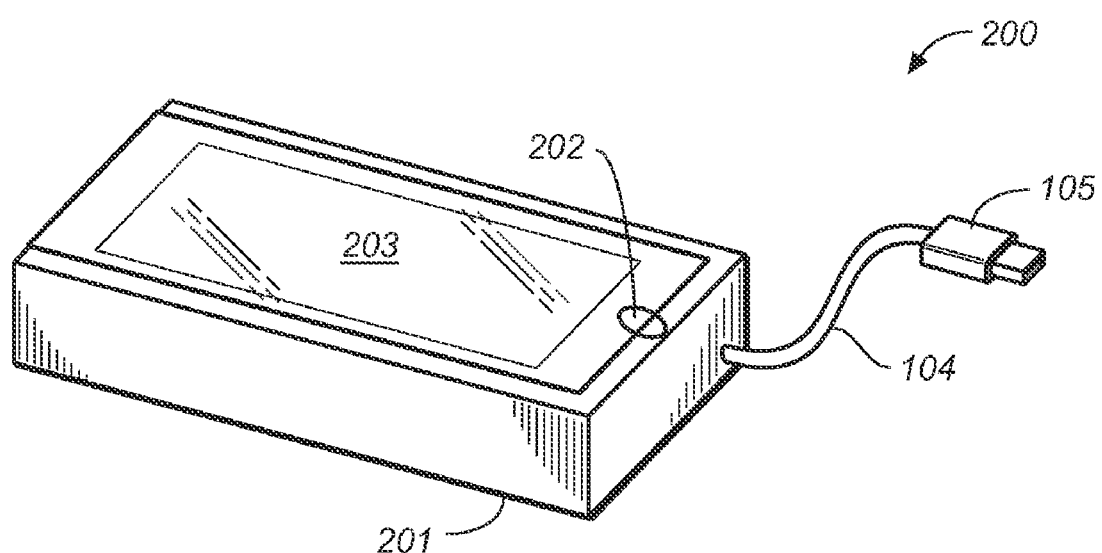
FIG. 2 illustrates an apparatus according to an alternative embodiment

FIG. 2 shows system 200, which is an alternative exemplary embodiment. In the illustrated embodiment, the enclosure 201 is flat. The enclosure has the same USB components: a cable 104 and a connector 105, as well as the USB components not shown, as in FIG. 1 above. The enclosure has, however, a soft, flexible membrane for the cover 203, with a closing mechanism 202 that could be, for example, a magnet, either in one spot or as a strip around the perimeter of the cover or the perimeter of the enclosure opening. The flexible membrane has an area of transparency of some type, either as a window or as the entire cover 203, which remains flexible along with being transparent, thus enabling a user to see, for example, the details of the device in the enclosure and to locate and push a button or switch on the device as required. It is clear that there is an overlap of the housing of the enclosure 201 and the membrane cover 203 so that that even when the user distorts the membrane to the degree required to make appropriate contact with a button or switch on the device in the enclosure, no gap would open between the housing of the enclosure 201 and the membrane cover 203.

These two systems 100 and 200 as described above in the descriptions of FIG. 1 and FIG. 2 could be used in many places, such as offices, homes, and public places including hotels, transportation terminals, so-called Internet cafes, etc. In yet one other case such an enclosure, or enclosures, may be used for the user to shield two or more devices. For example, when a source handset is transferring its contents to a target handset. In some cases, each device would have its own enclosure, in other, there would be only one common enclosure.

Figure 3:
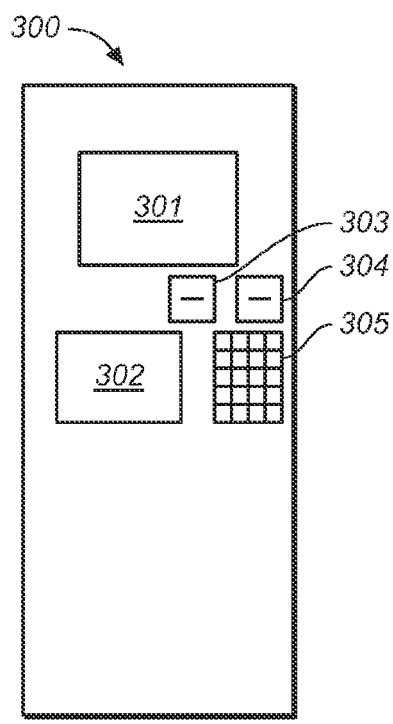
FIG. 3 illustrates an apparatus integrated in a KIOSK, in accordance with one embodiment.

FIG. 3 shows such an enclosure 302 integrated into a kiosk 300. Also integrated into kiosk 300 are a display 301, a credit card reader 303, a cash payment slot 304, and a keyboard or other user input device 305. This self-service kiosk 300 could be placed in locations such as phone company stores, as well as the above-named public locations and other public places. The kiosk with the enclosure would allow a Bluetooth-enabled device to be upgraded or updated with data, payments to be made, etc. in a secure manner in a public place, such as a phone store, mall, hotel lobby, airports etc.

Figure 4:
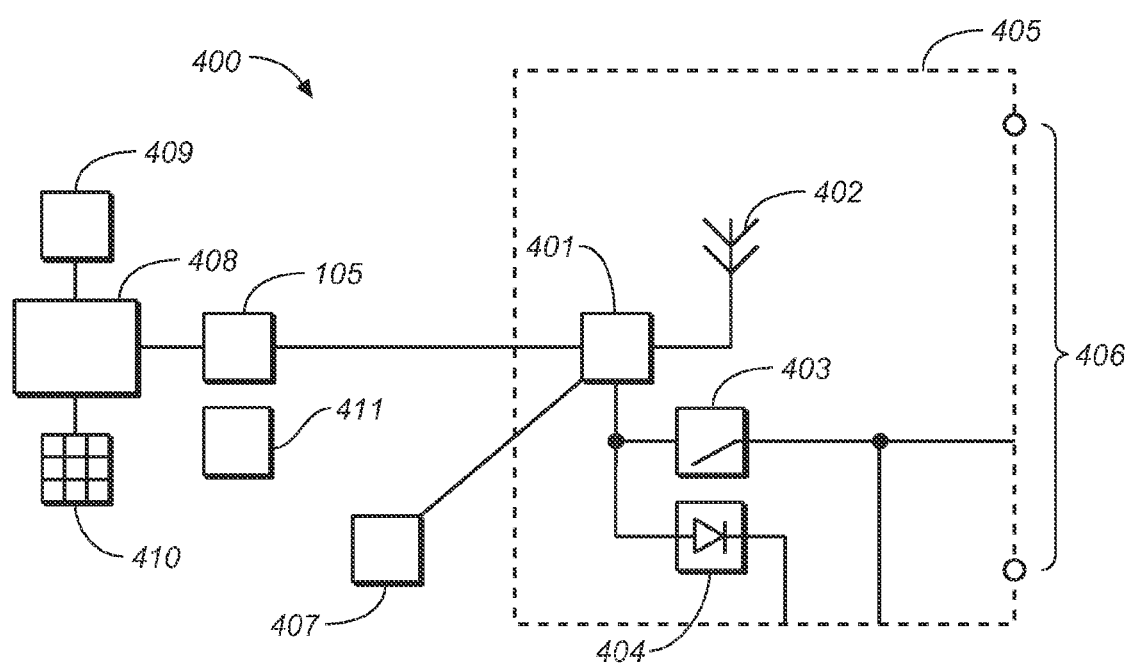
FIG. 4 illustrates architecture view of an apparatus, according to one embodiment.

FIG. 4 shows a simplified overview of the architecture view of a system 400 according to an example of the present invention. An enclosure 405 shown as a dotted line has a door section 406. Inside the enclosure is a Bluetooth controller 401 that contains firmware 407 In one embodiment, the enclosure includes an antenna 402, some switches 403, one of which could, for example, sense movement of the door 406 and others of which may be controlled by a user. In one embodiment, the system includes a display element 404 that could be, for example, a green light to indicate that the door section 406 is properly closed and a red or orange light to indicate that the door is not closed and thus the system is not ready to begin data transfer. In some cases, alphanumeric displays may be integrated into the enclosure. In one embodiment, controller 401 connects via USB connector 105 to a PC or similar device 408, which may have its own display 409. A PC or similar device 408, connected to a user input device 410, contains a software instance 411 suitable for operating the system and delivering or receiving the data transferred, either locally or through a network connection.

Figure 5:
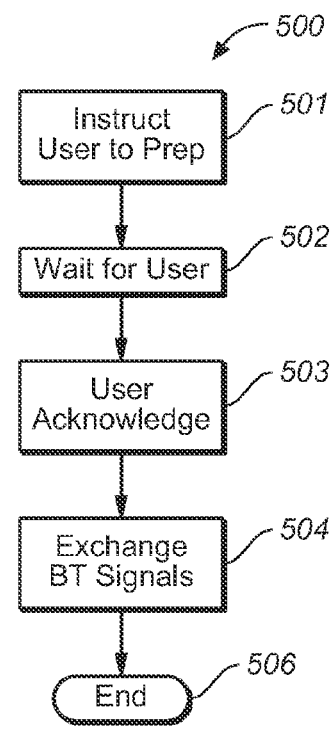
FIG. 5 illustrates a flow diagram describing a process, in accordance with one embodiment.

FIG. 5 shows an exemplary process 500 for operation of the system according to one embodiment. In process 501 the user first identifies his device, and in some cases himself or his account data (e.g., username and password). Then the system instructs the user how to prepare his device for data transfer prior to insertion into the system enclosure. In process 502 the system waits for the user to indicate that his device is prepared. Such preparation of the device by the user may require several processes, which may vary depending on the nature of the device. In process 503 the user acknowledges that his device is prepared, and in process 504 the exchange of Bluetooth signals begins between the user's device and the Bluetooth transceiver and the PC or equivalent including the bonding and exchange of private information, which remains secure from others intercepting the exchanged data. After the exchange is complete, in process 506 the process ends. This termination process 506 may include instructions to the user about how to properly terminate the connection and disengage his device from the system.

From this description, it will be appreciated that certain aspects are embodied in the user devices, certain aspects are embodied in the server systems, and certain aspects are embodied in a system as a whole. Embodiments disclosed can be implemented using hardware, programs of instruction, or combinations of hardware and programs of instructions.

In general, routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements involving the various aspects.

While some embodiments have been described in the context of fully functioning computers and computer systems, those skilled in the art will appreciate that various embodiments are capable of being distributed as a program product in a variety of forms and are capable of being applied regardless of the particular type of machine or computer-readable media used to actually effect the distribution.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The instructions may be embodied in digital and analog communication links for electrical, optical, acoustical or other forms of propagated signals, such as carrier waves, infrared signals, digital signals, etc.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

Aspects disclosed may be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

In various embodiments, hardwired circuitry may be used in combination with software instructions to implement the techniques. Thus, the techniques are neither limited to any specific combination of hardware circuitry and software nor to any particular source for the instructions executed by the data processing system.

In this description, various functions and operations are described as being performed by or caused by software code to simplify description. However, those skilled in the art will recognize what is meant by such expressions is that the functions result from execution of the code by a processor, such as a microprocessor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

Although the disclosure has been provided with reference to specific exemplary embodiments, it will be evident that the various modification and changes can be made to these embodiments without departing from the broader spirit as set forth in the claims. Accordingly, the specification and drawings are to be regarded in an illustrative sense rather than in a restrictive sense.

What is claimed is:

1. An apparatus comprising:
    an enclosure formed of electromagnetically shielding material that prevents an electromagnetic field from entering an interior of the enclosure or emitting from the interior of the enclosure, the enclosure sized to house a mobile electronic device;
    a receiver within an interior of the enclosure to receive data transferred wirelessly from a mobile electronic device placed within the enclosure; and
    a hardware interface having a first end external to the enclosure and a second end within the interior of the enclosure and coupled to an antenna, the hardware interface to transfer data wirelessly received by the receiver to a separate device exterior to the enclosure.

2. The apparatus of claim 1, wherein the receiver is an antenna to wirelessly receive data via a Bluetooth wireless protocol from a Bluetooth enabled device placed within the enclosure.

3. The apparatus of claim 2, wherein the hardware interface is a Universal Serial Bus (USB) connector.

4. The apparatus of claim 3, wherein the enclosure comprises an access door having a locking mechanism.

5. The apparatus of claim 3, wherein the USB connector comprises a USB cable extending from the enclosure, and includes a physical connector at the first end.

6. The apparatus of claim 2, further comprising the enclosure having at least one surface comprising of transparent flexible membrane positioned to facilitate a user to contact and engage a user interface of the Bluetooth enabled device placed within the enclosure.

7. The apparatus of claim 2, wherein the enclosure comprises a radiation enclosure.

8. The apparatus of claim 2, wherein the enclosure is sized to house two or more mobile electronic devices.

9. The apparatus of claim 1, wherein the enclosure is integrated within a KIOSK system.

10. The apparatus of claim 9, wherein the KIOSK system includes one or more of a display, a credit card reader, a cash payment slot, and a user input device.

11. A method comprising:
    receiving from a user identification of a mobile electronic device to be inserted in an enclosure formed of electromagnetically shielding material that prevents an electromagnetic field from entering an interior of the enclosure or emitting from the interior of the enclosure, the enclosure sized to house the mobile electronic device, the enclosure comprising a receiver within an interior of the enclosure to receive data transferred wirelessly from a mobile electronic device placed within the enclosure, and the enclosure comprising a hardware interface having a first end external to the enclosure and a second end within the interior of the enclosure and coupled to an antenna, the hardware interface to transfer data wirelessly received by the receiver to a separate device exterior to the enclosure;
    providing to the user instructions to prepare the mobile electronic device for data transfer prior to insertion in the enclosure;
    receiving an indication that the inserted mobile electronic device is prepared for data transfer; and
    wirelessly exchanging data with the inserted mobile electronic device within the enclosure formed of electromagnetically shielding material that prevents an electromagnetic field from entering an interior of the enclosure and intercepting the exchanged data.

12. The method of claim 11, wherein wirelessly exchanging data comprises wirelessly exchanging data via a Bluetooth wireless protocol, and the inserted mobile electronic device is a Bluetooth enabled device.

13. The method of claim 12, wherein the hardware interface is a Universal Serial Bus (USB) connector.

14. The method of claim 13, wherein the enclosure comprises an access door having a locking mechanism.

15. The method of claim 13, wherein the USB connector comprises a USB cable extending from the enclosure, and includes a physical connector at the first end.

16. The method of claim 12, further comprising the enclosure having at least one surface comprising of transparent flexible membrane positioned to facilitate a user to contact and engage a user interface of the Bluetooth enabled device placed within the enclosure.

17. The method of claim 12, wherein the enclosure is sized to house two or more mobile electronic devices.

18. The method of claim 11, wherein the enclosure is integrated within a KIOSK system.

19. The method of claim 18, wherein the KIOSK system includes one or more of a display, a credit card reader, a cash payment slot, and a user input device.

20. A non-transitory tangible computer readable medium having stored thereon a set of instructions, which when executed, perform a method comprising:
    receiving from a user identification of a mobile electronic device to be inserted in an enclosure formed of electromagnetically shielding material that prevents an electromagnetic field from entering an interior of the enclosure or emitting from the interior of the enclosure, the enclosure sized to house the mobile electronic device, the enclosure comprising a receiver within an interior of the enclosure to receive data transferred wirelessly from a mobile electronic device placed within the enclosure, and the enclosure comprising a hardware interface having a first end external to the enclosure and a second end within the interior of the enclosure and coupled to an antenna, the hardware interface to transfer data wirelessly received by the receiver to a separate device exterior to the enclosure;
    providing to the user instructions to prepare the mobile electronic device for data transfer prior to insertion in the enclosure;
    receiving an indication that the inserted mobile electronic device is prepared for data transfer; and wirelessly exchanging data with the inserted mobile electronic device within the enclosure formed of electromagnetically shielding material that prevents an electromagnetic field from entering an interior of the enclosure and intercepting the exchanged data.

* * * * *